April 14, 1964
L. W. GREEN
3,128,632
FORCE-BALANCED MULTIPLE POSITION SEALS
FOR VALVES AND THE LIKE
Filed Feb. 24, 1961
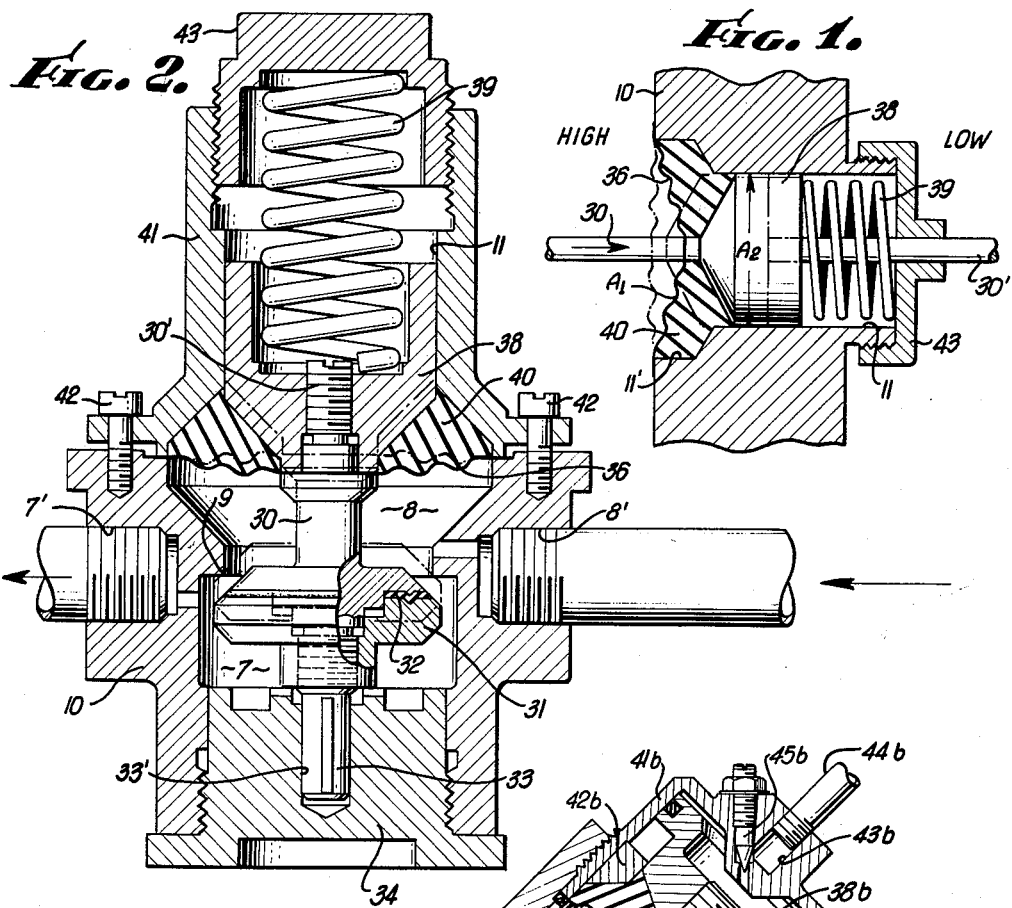
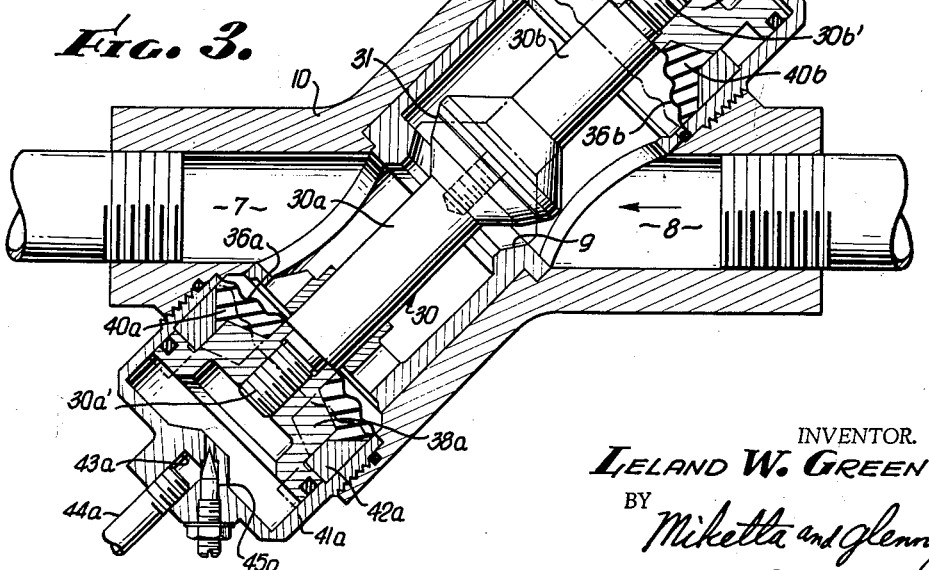
INVENTOR.
LELAND W. GREEN
BY Miketta and Glenny
ATTORNEYS.

United States Patent Office 3,128,632
Patented Apr. 14, 1964

3,128,632
FORCE-BALANCED MULTIPLE POSITION SEALS FOR VALVES AND THE LIKE
Leland W. Green, Santa Monica, Calif., assignor to Calmec Manufacturing Co., Los Angeles, Calif., a corporation of California
Filed Feb. 24, 1961, Ser. No. 91,437
2 Claims. (Cl. 74—18.2)

This invention relates to a fluid-tight seal particularly adapted for use around a reciprocating shaft or stem whereby a tight and effective seal may be maintained during axial movement or reciprocation of such a shaft even under conditions of high pressure, high or low temperature and the action of corrosive gases or fluids, the seal being thin and flexible and not subjected to differential pressures but instead operating under balanced pressures in all positions of the shaft or stem. The invention also relates to valves of various types in which the pressure seal is employed.

Although metallic and rubber diaphragms have been used in numerous valves, meters, etc., one surface of such disk has normally been exposed to a fluid or gas at one pressure and the other surface of the diaphragm or disk has been exposed to atmospheric pressure or some other pressure which is not equal to that of the gas or fluid. Such prior devices have been ordinarily only employed in relatively low pressure devices and are not adapted for use at high pressures. The present invention permits the use of extremely thin diaphragms of metal, plastic composition, rubber, synthetic rubber and other materials of a character adapted to withstand the temperatures and corrosive or destructive effects of the fluid being handled, without impairment of their characteristics. Such thin diaphragms (which may be only 0.002 inch to 0.01 inch in thickness) have very little tensile or bursting strength, but in accordance with the construction described hereinafter may be employed at high pressures and extreme temperatures over prolonged periods of time without failure.

The constructions hereinafter disclosed may be employed in many different types of valves and wherever it is desirable to move a shaft, control rod, valve or the like in a chamber or zone containing high pressure fluids or other media. Movement of the stem or control valve may be imparted by mechanical or fluid-actuated means from a zone of low pressure or the movement of such stem may be occasioned by the pressure of the fluid within the chamber. Many adaptations of the present invention will become apparent from subsequent description.

One of the objects of the present invention, therefore, is to disclose and provide a force-balanced, multiple position, diaphragm-type seal for valves and wherever a shaft, rod or stem need be axially moved within a chamber containing fluids at relatively high pressure.

A further object of the invention is to disclose and provide a seal construction employing a counterbalanced or force-balanced diaphragm which is flexible and capable of resisting the pressures to which it is subjected without the necessity of employing packings or fluid seals which are normally subjected to leakage.

Another object of the invention is to disclose and provide various types of valves, pressure regulators, pressure reducing valves and the like employing the seal of the present invention in association with a valve stem which is movable with respect to the valve body.

These and other objects and advantages of the present invention will become apparent from the following exemplary constructions. In order to facilitate understanding, reference will be had to the appended drawings in which:

FIG. 1 is a schematic representation of the seal as it can be embodied in the wall of a vessel, reactor or other device;

FIG. 2 is an axial section taken through a pressure relief or regulator valve; and FIG. 3 is a longitudinal section through another form of valve.

In the diagrammatic representation, FIG. 1, a body or wall 10 is illustrated, such body or wall representing the wall of a valve, submarine, reactor or other rigid object through which an actuating stem or rod 30 extends. It is assumed in this representation that the left-hand side is at high pressure (so indicated) and the right-hand side of the wall represents a zone of low pressure. The body or wall 10 is provided with a bore 11 and an enlarged counter bore 11'. A flexible, resilient, vapor and corrosion resistant diaphragm 36, made of any suitable material capable of withstanding the pressures on the high side of the body 10, has its outer edge suitably and firmly connected to the wall 10 and its central area positively connected to the stem or control valve 30. The control rod 30 also carries an enlarged piston 38 slidably mounted in the bore 11, the control rod or stem 30' being then provided with an extension leading into the low pressure side of the body 10.

The diaphragm 36 presents an annular face to the vapors or fluids on the high side of the wall 10. Since this diaphragm is generally very thin in order to have the desired resilience and flexibility, it is provided with a back-up material 40 in the form of a mobile body which is trapped or restrained between the outer face of the diaphragm 36 and the piston 38. This body 40 is preferably mobile, non-compressible, deformable, and resistant to whatever temperature may be transmitted thereto through the diaphragm 36. Various substances and materials may be used for the mobile back-up material 40 such as, for example, granular or powdered graphite, relatively soft synthetic rubber or high temperature rubber compositions, powdered or granular inorganic materials such as mica, steatite or the like and other substances. In order to maintain the diaphragm 36 under force-balanced conditions, the piston 38 has an effective diameter A2 which is substantially equal to the effective area A1 of the diaphragm 36 which is exposed to the pressure conditions on the high side of the seal. When the device is arranged to operate at a given high pressure condition in the left-hand zone, a suitable pressure is applied to the outer face of the piston 38 as for example by means of the balancing spring 39 and gland 43. Instead of applying mechanical pressure, controlled fluid pressure may be used.

It will be evident from the description given that the device provides a means for retaining a body of mobile, virtually incompressible back-up material 40 in contact with the outer annular face of the diaphragm 36, that means have been provided for retaining said body of material 40 in contact with such annular face and for maintaining volumetric integrity of said body during movement of the diaphragm, and its associated control rod or stem 30. It is to be noted that when the valve stem or control rod 30 moves to the left with its piston 38 and the diaphragm 36 flexes into the position indicated in dotted lines, the volume of the mobile body 40 does not change but instead such body is simply deformed. When a compensating spring such as 39 is employed, the diaphragm 36 is therefore subjected to balanced pressure from both sides and rupture of the diaphragm due to differential pressures is obviated. A tight seal is maintained at all positions of the stem or control rod 30, during its movement axially through the body or wall 10. The diaphragm is maintained under compression by balanced pressure being applied thereto from both inner and outer annular faces during operation.

The general teachings disclosed in FIG. 1 may be adapted for use in various valves. Generally stated when applied to a valve, the stem is associated with a valve element capable of being moved into and out of seating contact with a suitable valve seat. The chamber containing the valve element and valve stem is closed or sealed at one end by an assembly including the flexible diaphragm which is attached to the valve stem and to the valve body.

FIG. 2 illustrates a regulating or pressure control valve in which the seal of the present invention is utilized. Whenever possible the same numbers will be applied to portions of this figure which are analogous to the diagrammatic representation of FIG. 1. In FIG. 2 the valve body 10 encloses an inner chamber divided by a valve seat 9 into an inlet chamber portion 8 which can be supplied with fluid through a suitable inlet passageway 8' and an outlet chamber portion 7 in communication with the outlet port or passageway 7'. A valve stem 30, carried by the valve element 31 is movably positioned within the chamber, the valve element being adapted to seat upon the seat 9. The valve element 31 may be of the poppet type and be provided with an inclined face carrying a Teflon or other suitable seating surface 32. Moreover, the valve element 31 may be provided with a guide pin 33 extending into and slidable within a suitable axial cavity 33' formed in the end plug 34 which is threadedly connected to the valve body 10.

A flexible, resilient, vapor and temperature resistant disk-like diaphragm 36 is firmly connected to the valve stem 30, the outer edges of such diaphragm being also attached to the valve body 10 as by brazing or welding. Such diaphragm 36 presents an annular face to the pressure fluid within the chamber portion 8. A body of mobile, virtually incompressible back-up material 40 is in contact with the outer annular face of the diaphragm 36. Means, associated with the valve body 10, are provided for retaining this body of material 40 in contact with the outer annular face of the diaphragm. Such means may include the outer shell 41 which is suitably attached to the valve body as by machine screws 42. Means are also provided for maintaining volumetric integrity of the body 40 during movement of the diaphragm 36 and its associated valve stem 30 and valve element 31. Such means may include the piston 38 slidably received in the bore 11 of the body extension 41 or shell, such piston 38 being threadedly connected to the valve stem 30 as by means of the threaded portion 30' of such valve stem. As previously indicated, the effective end area of the piston 38 is substantially equal to the area of the inner face of the annular diaphragm 36 which is exposed to the pressure fluid within the chamber portion 8. A counterbalancing spring 39 is positioned to act upon the piston 38, the pressure of such spring 39 being adjustable by means of an adjusting cap or gland 43 threadedly mounted on the end of member 41.

A valve of the character described in FIG. 2 is particularly adapted to maintain a desired pressure in whatever zone is connected to the outlet chamber 7 through the passageway 7'. The valve will close whenever the pressure of fluid being supplied through the inlet passageway 8' falls below a predetermined minimum. It will be noted that a thin, flexible diaphragm 36 is employed, such diaphragm being maintained under compression at all times by balanced pressures being applied to both inner and outer annular faces of such diaphragm during operation. The diaphragm should be vapor and temperature resistant, resistant to corrosive effects of whatever fluid is being handled and should be flexible and resilient. The diaphragm is not subject to wear such as is normally exhibited by packings in normal seals.

FIG. 3 illustrates still another type of valve in which the seal of the present invention may be utilized. For clarity, whenever possible, the same reference numbers will be applied to portions of this figure which are analogous to the diagrammatic representation of FIG. 1. The valve in FIG. 3 includes a valve body 10 enclosing an inner chamber divided by a valve seat 9 into an inlet chamber portion 8 and an outlet chamber portion 7. A valve stem 30, carried by the valve element 31 is movably positioned within the chamber, the valve element being adapted to seat upon the seat 9. The valve element 31 may be of the poppet type and inclined at an angle (45°) with respect to the axis of the valve.

The valve element 31 is adapted to be moved into and out of contact with the seat 9 by valve stems 30a and 30b connected on either side thereof. The outer end of each valve stem 30a and 30b is provided with a seal in accordance with the present invention and for clarity and convenience, the elements on the inlet and outlet sides of valve element 31 will be referred to by the same number with the addition of the letter "a" representing the outlet side and the letter "b" representing the inlet side.

A flexible, resilient, vapor and temperature resistant disk-like diaphragm 36a, 36b is firmly connected to each of the valve stems 30a, 30b, the outer edges of such diaphragms being also attached to the valve body 10 by suitable means such as brazing or welding. Each of the diaphragms 36a, 36b presents an annular face to the pressure fluid within the chamber portions 7 and 8. A body of mobile, virtually incompressible back-up material 40a, 40b is in contact with the outer annular face of each of the diaphragms 36a and 36b. Means, associated with valve body 10, are provided for retaining these bodies of material 40a and 40b in contact with the outer annular faces of each of the diaphragms 36a and 36b, respectively. Such means may include the outer shells 41a and 41b having inner annular rings 42a and 42b, respectively, such shells being threadedly secured to the valve body 10.

Means are also provided for maintaining volumetric integrity of the bodies 40a and 40b during movement of the diaphragms 36a and 36b and their associated valve stems 30a and 30b and valve element 31. Such means may include pistons 38a and 38b slidably received in bores 11a and 11b, respectively, of the body extensions or shells 41a and 41b, such pistons 38a and 38b being threadedly connected to valve stems 30a and 30b, as by means of the threaded portions 30a' and 30b', respectively. As indicated hereinabove, the effective end area of each of the pistons 38a and 38b is substantially equal to the area of the inner face of each of the annular diaphragms 36a and 36b, respectively, which is exposed to the pressure fluid within the chamber portions 7 and 8.

Fluid-actuated means may be provided to act upon each of the pistons 38a and 38b for opening and closing the valve element 31 with respect to the seat 9. Such means may include ports 43a and 43b provided in the ends of shells 41a and 41b, respectively, and adapted to receive fluid conduits 44a and 44b, adapted to be connected with a remotely-controlled fluid source. Needle-valves 45a and 45b may be provided in shells 41a and 41b, respectively, for controlling the size of the opening into shells 41a and 41b. It can be easily understood that by proper supply of fluid to the ends of pistons 38a and 38b, the valve element 31 may be actuated to control the flow of fluid through the valve body 10.

In the valve as shown in FIG. 3, the thin, flexible diaphragms 36a and 36b are maintained under compression at all times by balanced pressures being applied to both inner and outer annular faces of the diaphragms during operation. Seals are therefore provided for the valve stems 30a and 30b which are not subjected to stresses and strains due to unbalanced forces acting thereon. Moreover, packings or the like are eliminated to avoid leakage due to corrosion and wear.

It is understood that the fluid-tight seal of the present invention may be used in other pressurized fluid devices than valves or regulators. The invention is simple and extremely inexpensive to produce. The material for the diaphragm need have little tensile or bursting strength as it functions under balanced forces during operation.

Obviously, many modifications and variations of the present invention are possible in the light of the above teachings. It is therefore to be understood that within the scope of the appended claims, the invention may be practiced otherwise than as specifically described.

I claim:

1. A force-balanced seal adapted for use in conjunction with a stem, control rod or the like movably associated with a stationary wall body, comprising:
   a wall body provided with a bore and a stem extending into said bore;
   a thin, flexible corrosion-resistant annular diaphragm having its outer edge firmly attached to said wall body at said bore and its inner edge firmly attached to said stem to seal said bore;
   a body of mobile, virtually incompressible back-up material within said bore and in contact with the outer annular face of said thin diaphragm; the inner annular face of said thin diaphragm being subjected to a predetermined pressure within said wall body; and
   predetermined controllable force applying means for continuously retaining said body of material in contact with and support for said outer annular face of said diaphragm at all positions of movement of said stem and diaphragm so as to provide balanced pressures on the inner and outer annular faces of said diaphragm during all positions of movement thereof.

2. A force-balanced seal as stated in claim 1 wherein said predetermined controllable force-applying means includes
   a piston carried by said stem in spaced relation to said outer annular face of said diaphragm;
   a bore in said wall body slidaby receiving said piston, the effective cross-sectional area of said piston being virtually equal to the effective area of said annular seal; and
   means for applying a controllable force to said piston.

References Cited in the file of this patent
UNITED STATES PATENTS

| 1,003,916 | Koenig | Sept. 19, 1911 |
| 2,703,016 | Wagner | Mar. 1, 1955 |